(12) United States Patent
Shin et al.

(10) Patent No.: US 9,913,197 B2
(45) Date of Patent: *Mar. 6, 2018

(54) BEACON DEVICE FOR SEAMLESS SERVICE, AND CONTROL METHOD THEREOF

(71) Applicant: SK Planet Co., Ltd., Gyeonggi-do (KR)

(72) Inventors: Chulyong Shin, Seoul (KR); Jaehyung Huh, Gyeonggi-do (KR)

(73) Assignee: SK PLANET CO., LTD., Seongnam-si, Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/416,874

(22) Filed: Jan. 26, 2017

(65) Prior Publication Data

US 2017/0142635 A1 May 18, 2017

Related U.S. Application Data

(63) Continuation of application No. 14/534,789, filed on Nov. 6, 2014, now Pat. No. 9,591,552.

(30) Foreign Application Priority Data

Mar. 21, 2014 (KR) .................. 10-2014-0033300

(51) Int. Cl.
*H04W 40/24* (2009.01)
*H04W 4/00* (2018.01)
*H04H 20/16* (2008.01)

(52) U.S. Cl.
CPC .......... *H04W 40/244* (2013.01); *H04H 20/16* (2013.01); *H04W 4/008* (2013.01)

(58) Field of Classification Search
None
See application file for complete search history.

(56) References Cited

U.S. PATENT DOCUMENTS

| 2015/0079942 A1* | 3/2015 | Kostka | G06Q 30/0633 455/411 |
| 2015/0177006 A1* | 6/2015 | Schulz | H04W 4/02 701/537 |
| 2015/0195673 A1 | 7/2015 | Rantapuska et al. | |

FOREIGN PATENT DOCUMENTS

EP 2 894 834 A1 7/2015

* cited by examiner

*Primary Examiner* — Alejandro Rivero
(74) *Attorney, Agent, or Firm* — Fenwick & West LLP

(57) ABSTRACT

Provided are a beacon device and a control method for seamless service. The beacon device includes a plurality of Bluetooth communication modules. The beacon device activates one of the plurality of Bluetooth communication modules to broadcast a beacon signal. While the activated Bluetooth communication module is connected to any terminal device, the beacon device activates another one of the plurality of Bluetooth communication modules to broadcast the beacon signal, enabling the seamless service.

11 Claims, 4 Drawing Sheets

[FIG. 1]
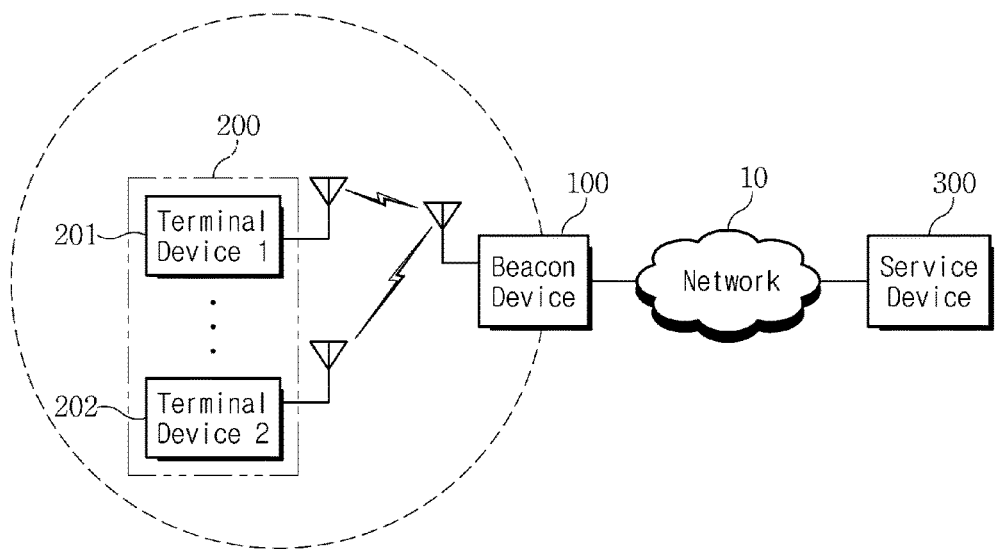
[FIG. 2]
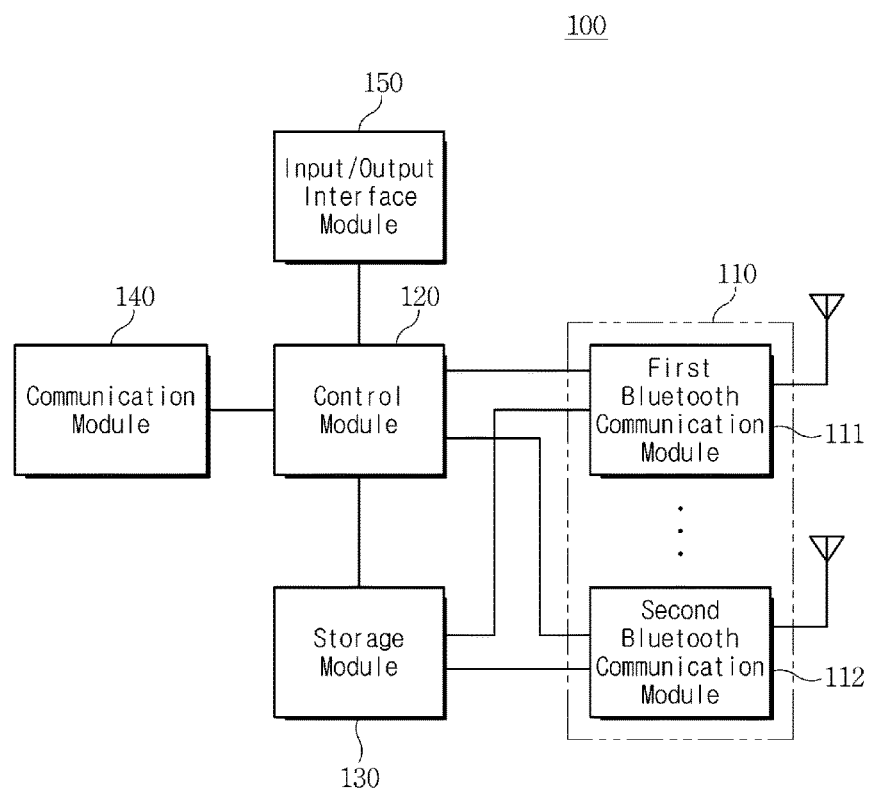

[FIG. 3]
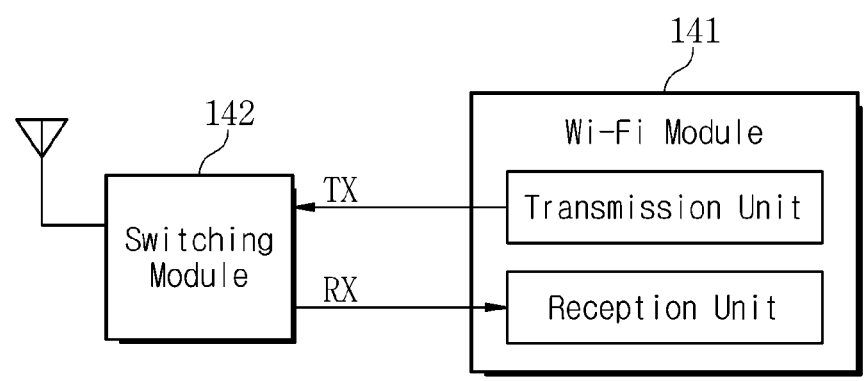

[FIG. 4]
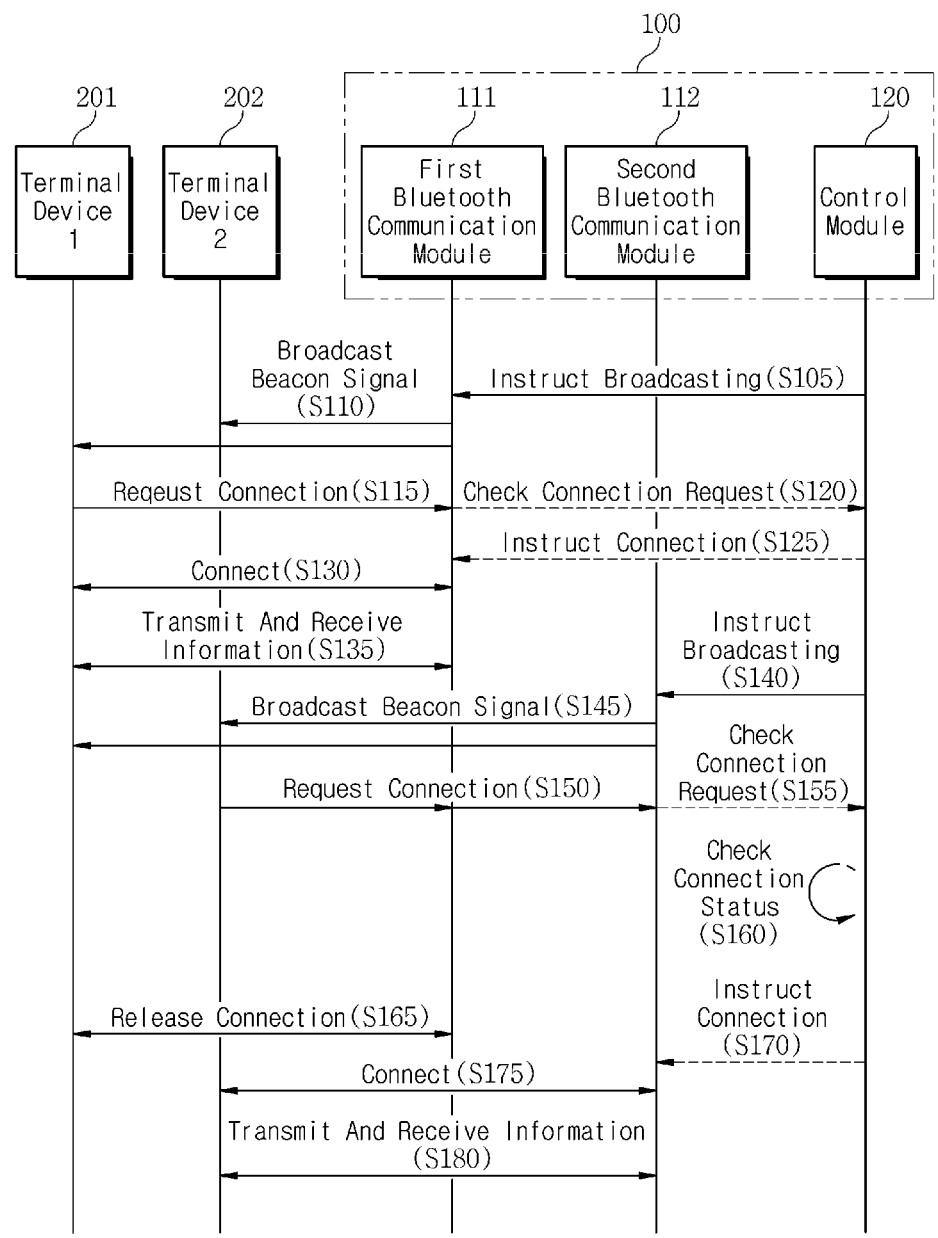

[FIG. 5]
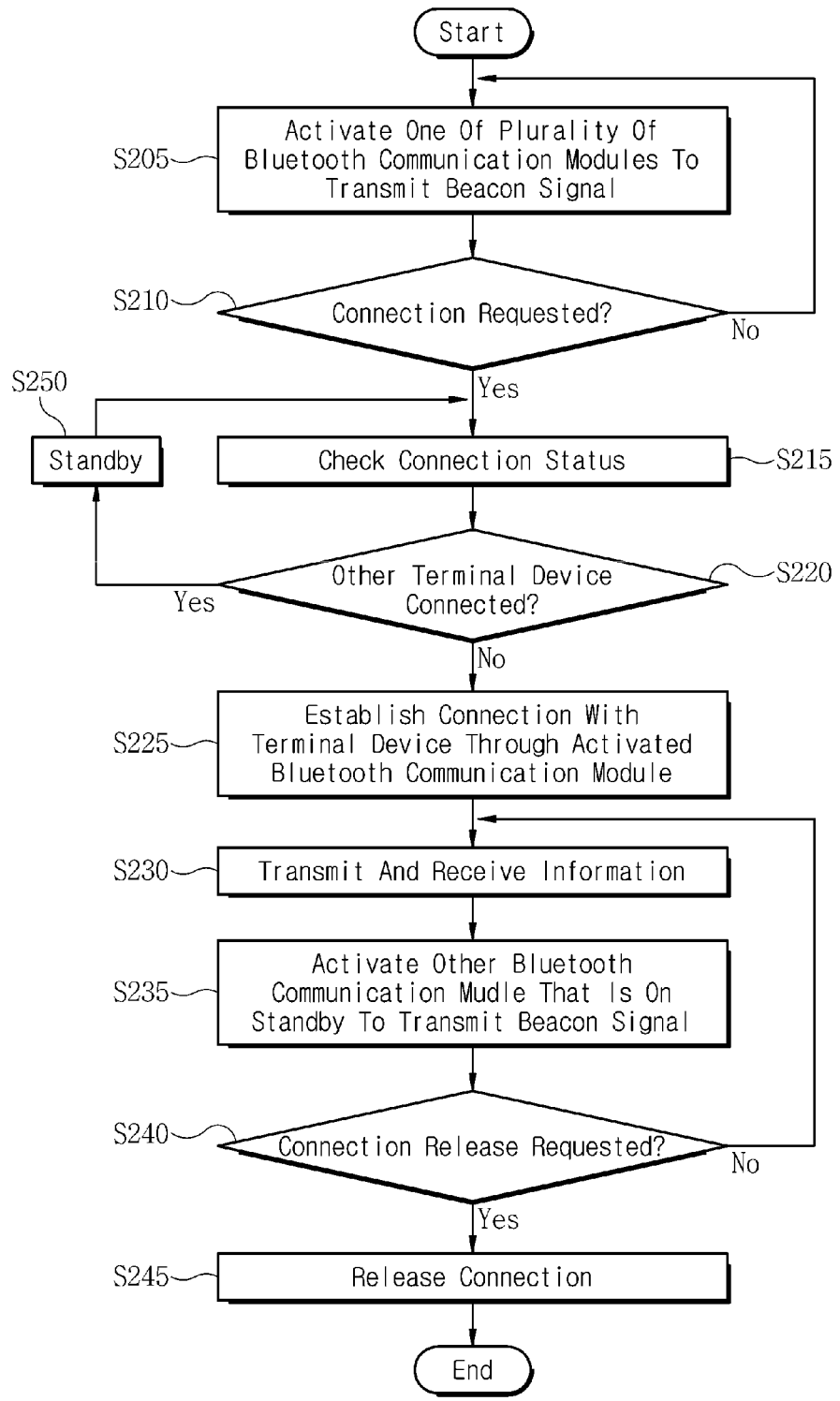

BEACON DEVICE FOR SEAMLESS SERVICE, AND CONTROL METHOD THEREOF

CROSS-REFERENCE TO RELATED APPLICATION

This application is a continuation of U.S. application Ser. No. 14/534,789 filed Nov. 6, 2014, which claims priority to and the benefit of Korean Patent Application No. 10-2014-0033300 filed in the Korean Intellectual Property Office on Mar. 21, 2014, the entire contents of which are incorporated herein by reference.

BACKGROUND OF THE INVENTION

1. Field of the Invention

The present invention relates to a beacon device for providing a location-based service, and more particularly, to a beacon device for a seamless service and a control method thereof, which enables nearby terminal devices to always recognize the beacon device by seamlessly broadcasting a beacon signal even while a connection is established with a specific terminal device.

2. Description of Related Art

This section is intended to merely provide background for embodiments of the present invention and is not considered to be the prior art in the claims.

With the development of mobile networks and the advance in terminal specifications, mobile communication terminals have become the necessity for modern people and have evolved into total entertainment devices beyond typical simple communication devices or information providing devices.

Further, technologies for performing a short-distance wireless communication between devices that are located within a short distance are being rapidly developed, one of which is Bluetooth communication.

Such Bluetooth communication has evolved into Bluetooth low energy (BLE) technology, which is released recently. BLE is a protocol stack that has lower power consumption than a standard Bluetooth wireless connection and as such, supports simple and quick connection, which is used in various fields such as a machine-to-machine (M2M) communication, a geo-fence, mobile payment, and a location-based service system (for example, an indoor positioning system (IPS)). The Bluetooth low energy (BLE) technology has lower power consumption than a standard Bluetooth wireless connection and therefore is mainly used for mobile payment in recent years.

In particular, a location-based service system is a technology for recognizing persons and objects in a building using optics, wireless communication, magnetic field, and voice technology, instead of GPS satellites. As portable smart devices, such as a smartphone or tablet PC, are widely used and the demand for accurate indoor positioning increases, research is being conducted on the location-based service system.

Basically, the location-based service system is configured to calculate the location or provide the location-based service by installing beacon devices in many indoor places and enabling a user's terminal device to communicate with an adjacent beacon device using the short-distance communication technology.

In communication between the beacon device and the terminal device, the Bluetooth low energy (BLE) technology may be used.

On the basis of the Bluetooth low energy (BLE) technology, the beacon device broadcasts a predetermined beacon signal while operating in a peripheral mode that is defined in the BLE technology and transmits predetermined information when a terminal device that operates in a central mode defined in the BLE technology receives the beacon signal to recognize and access the beacon device.

However, when operating in the peripheral mode, the existing beacon device cannot broadcast the beacon signal while connected with a specific terminal device and thereby other neighboring terminal devices cannot recognize the beacon device.

BRIEF SUMMARY OF THE INVENTION

The present invention is directed to providing a beacon device for a seamless service, which enables nearby terminal devices to always recognize the beacon device by seamlessly broadcasting a beacon signal even when connection with a specific terminal device is established, and a control method thereof in order to solve a service discontinuity problem caused by the beacon device that has stopped the broadcasting when the service is provided based on a location-based service system.

The present invention is also directed to providing a beacon device for a seamless service, which includes a plurality of Bluetooth communication modules and performs control such that one of the plurality of Bluetooth communication modules is activated to broadcast a beacon signal and, while the activated Bluetooth communication module is connected to any terminal device, another one of the plurality of Bluetooth communication modules is activated to broadcast the beacon signal such that a seamless service is enabled, and a control method thereof.

One aspect of the present invention provides a beacon device for a seamless service including: a plurality of Bluetooth communication modules each configured to broadcast a beacon signal and, according to a request from a terminal device that has received the beacon signal, establish connection with the terminal device to transmit and receive information; and a control module configured to perform control such that one of the plurality of Bluetooth communication modules is activated to broadcast the beacon signal and another one of the plurality of Bluetooth communication modules is activated to broadcast the beacon signal when the activated Bluetooth communication module is connected with the terminal device.

The beacon signal may include unique identification information assigned to the beacon device.

The beacon device may further include a storage module connected to the plurality of Bluetooth communication modules and configured to store the information and provide the stored information to the one of the plurality of Bluetooth communication modules; and a communication module connected to a wired network or wireless network and configured to communicate with a service device through the wired network or wireless network.

The communication module may be implemented as any one of a Wi-Fi communication module, a Zigbee communication module, a mobile communication module, an optical communication module, a cable communication module, and a wired Internet communication module.

The control module may perform control such that connection with the terminal device is established through a Bluetooth communication module that has broadcast the beacon signal when a connection request is received from the terminal device. The control module may further determine whether connection with another terminal device is established when a connection request is received from the terminal device, and perform control such that connection with the terminal device is established after the connection with the other terminal device is released when the connection with the other terminal device is established.

Another aspect of the present invention provides a location-based service system including: a beacon device configured to perform control such that one of a plurality of Bluetooth communication modules is activated to broadcast a beacon signal and, when the activated Bluetooth communication module is connected with a terminal device, another one of the plurality of Bluetooth communication modules is activated to broadcast the beacon signal; at least one terminal device configured to recognize the beacon device by receiving the beacon signal and transmit and receive information for a location-based service through the recognized beacon device; and a service device configured to communicate with at least one of the beacon device and the terminal device through a network to provide the location-based service.

Still another aspect of the present invention provides a method of controlling a beacon device for seamless a service, the method including: broadcasting a beacon signal through any one of a plurality of Bluetooth communication modules; receiving a connection request from a terminal device that has received the beacon signal; establishing connection with the terminal device; and broadcasting the beacon signal through another one of the plurality of Bluetooth communication modules while the connection with the terminal device is established.

The method may further include determining whether connection with another terminal device is established through another one of the plurality of Bluetooth communication modules in which, when the connection with the other terminal device is not established, the connection establishment is performed.

The method may further include waiting until the connection with the other terminal device is released when the connection with the other terminal device is established through the other Bluetooth communication module in which, when the connection with the other terminal device is released, the connection establishment is performed.

The broadcasting may include broadcasting the beacon signal through a Bluetooth communication module that is on standby among the plurality of Bluetooth communication modules.

The performing of the connection establishment may include performing connection establishment with the terminal device through the Bluetooth communication module that has broadcast the beacon signal at a corresponding time.

Yet another aspect of the present invention provides a computer-readable recording medium having a program recorded thereon for performing the method of controlling a beacon device for a seamless service.

According to an embodiment of the present invention, the beacon device that is a reference for the location-based service includes a plurality of Bluetooth communication modules and activates one of the plurality of Bluetooth communication modules to broadcast a beacon signal, when the activated Bluetooth communication module is connected to a terminal device, activating another one of the plurality of Bluetooth communication modules to broadcast the beacon signal, thus preventing the beacon device from stopping broadcasting the beacon signal, and thereby preventing other nearby terminal devices from failing to recognize the beacon device.

In addition, the present invention seamlessly broadcasts the beacon signal such that the nearby terminal devices may always recognize the beacon device even when the connection with a specific terminal device is established, thereby enabling a seamless service.

BRIEF DESCRIPTION OF THE DRAWINGS

FIG. 1 is a block diagram showing a location-based service system according to an embodiment of the present invention.

FIG. 2 is a block diagram illustrating a configuration of a beacon device according to an embodiment of the present invention.

FIG. 3 is a block diagram showing a configuration of a communication module in a beacon device according to an embodiment of the present invention.

FIG. 4 is a sequence diagram illustrating a service performing process in a location-based service system according to an embodiment of the present invention.

FIG. 5 is a flowchart illustrating a control process of a beacon device according to an embodiment of the present invention.

DETAILED DESCRIPTION OF THE INVENTION

Hereinafter, embodiments of the present invention will be described in detail with reference to the accompanying drawings. However, detailed descriptions related to well-known functions or configurations will be ruled out in order not to unnecessarily obscure subject matters of the present invention. In addition, it should be noted that like reference numerals denote like elements throughout the specification and drawings.

The terms or words used in the specification and claims should not be construed as being limited to typical or dictionary meanings, but construed as the meaning and concept corresponding to the technical idea of the present invention on the basis of the principle that an inventor can appropriately define the concept of the term for describing his or her invention in the best method. Accordingly, the configurations illustrated in embodiments and drawings described in the specification do not represent the technical idea of the present invention but are just exemplary embodiments. Thus, it should be understood that various equivalents and modifications which can be replaced at a time when this specification is applied may exist.

While the terms including an ordinal number, such as "first," "second," etc. may be used herein to describe various elements, such elements are not limited to those terms. For example, a first component may be named a second component without being departed from the scope of the present invention and the second component may also be similarly named the first component.

It is to be understood that when one element is referred to as being "connected to" or "coupled to" another element, it may be connected or coupled logically or physically. In other words, it is to be understood that one element may be directly connected or coupled to another element or be indirectly connected or coupled to another element with a third element intervening therebetween.

Terms used in the present specification are used only in order to describe specific exemplary embodiments rather than limiting the present invention. Singular forms used herein are intended to include plural forms unless explicitly indicated otherwise. It will be further understood that the terms "include," "comprises," or "have" used in this specification, specify the presence of stated features, numerals, steps, operations, components, parts, or a combination thereof, but do not preclude the presence or addition of one or more other features, numerals, steps, operations, components, parts, or a combination thereof.

FIG. 1 is a block diagram showing a location-based service system according to an embodiment of the present invention.

Referring to FIG. 1, the location-based service system according to an embodiment of the present invention may include a beacon device 100, a terminal device 200, and a service device 300.

The beacon device 100 is a reference node for a location-based service. In a location-based service system, a position of the terminal device 200 may be calculated on the basis of location information of the beacon device 100 and information on a distance between the beacon device 100 and the terminal device 200, and a predetermined location-based service may be provided to terminal devices 200 adjacent with respect to the beacon device 100. The location-based service means a service that is provided based on location information or provided only in a predetermined region, and may include, but not limited to, a mobile payment service limited to a specific affiliate, a shop information service, and a Geo-fence service that is performed within a predetermined region with respect to a reference point. The beacon device 100 may be used as a reference point for selecting a service target in the location-based service.

The beacon device 100 is fixedly installed at a certain position to broadcast beacon signals in a certain interval and inform its own location to the terminal device 200 that approaches the beacon device 100, and establishes a communication session with the terminal device 200 to transmit and receive information for the location-based service to and from the terminal device 200 according to a request from the terminal device 200. Here, the beacon signal may include information for identifying the beacon device 100, that is, identification information that is uniquely assigned for each beacon device 100.

In this case, the beacon device 100 and the terminal device 200 may communicate on the basis of various short-distance communication technologies, for example, Bluetooth low energy (BLE) communication technology. Particularly, the beacon device 100 operates in a peripheral mode that is defined in BLE and broadcasts a beacon signal to nearby terminal devices 200.

Particularly, in an embodiment of the present invention, the beacon device 100 includes a plurality of Bluetooth communication modules. The beacon device 100 activates one of the plurality of Bluetooth communication modules to broadcast a beacon signal. While the activated Bluetooth communication module is connected to any terminal device 200, the beacon device 100 activates another one of the plurality of Bluetooth communication modules to broadcast the beacon signal such that other nearby terminal devices may recognize the beacon device 100.

Accordingly, the terminal device 200 that approaches the beacon device 100 according to an embodiment of the present invention may always recognize the beacon device 100 irrespective of an operational status of the beacon device 100.

Furthermore, the beacon device 100 may support the location-based service in cooperation with the service device 300 through a network 10.

In this case, the network 10 includes various forms of networks that have been already established, that is, next-generation networks and computing networks that are currently available or will be implemented in future such as mobile networks including code division multiple access (CDMA), wideband code division multiple access (WCDMA), global system for mobile communications (GSM), and long term evolution (LTE) and Wi-Fi network in addition to a closed network (for example, a local area network (LAN), a wide area network (WAN), etc.) and an open network (for example, the Internet).

Next, the terminal device 200 is a user's device that uses or receives the location-based service and may include at least one of a smartphone, a tablet PC, a laptop, a personal computer (PC), a personal digital assistant (PDA), a smart TV, or a mobile communication terminal. Particularly, the terminal device 200 according to an embodiment of the present invention should have a short-distance communication function capable of communicating with the beacon device 100, for example, a BLE function.

The terminal device 200 operates in a central mode that is defined in the BLE and performs a scanning procedure or discovery procedure to detect an adjacent beacon device 100 in a vicinity of the terminal device 200. During the detection of the beacon device 100, the terminal device 200 receives a beacon signal broadcasted from the beacon device 100 that is located within a communication-enabled distance, requests the beacon device 100 that broadcasts the beacon signal to establish connection, and connects to the beacon device 100.

The terminal device 200 transmits and receives information to and from the connected beacon device 100 to perform the location-base service.

Furthermore, the terminal device 200 may receive the location-based service in cooperation with the service device 300 using the connected beacon device 100.

For example, the terminal device 200 may receive location information from the beacon device 100, transmit the received location information to the service device 300, and receive a service (for example, a payment service, a geo-fence service, etc.) that is based on the location information.

As another example, the terminal device 200 may receive location information from one or more beacon devices 100 that is located in a vicinity of the terminal device 200, estimate a distance between the one or more beacon devices 100, and calculate its own location.

Last, the service device 300 provides the location-based service in communication with one or more of the beacon device 100 and the terminal device 200. For example, the service device 300 may manage a status of each beacon device 100 in communication with the beacon device 100 through the network 10. In addition, the service device 300 may receive information on the terminal device 200 connected with the beacon device 100 in communication with the beacon device 100 through the network 10 and then provide the location-based service on the basis of the received information. Furthermore, the service device 300 may provide the location-based service to the terminal device 200 in communication with the terminal device 200 that has recognized the beacon device 100 through the network 10.

The service device 300 may include various service devices that provide a specific service, for example, a geo-fence service providing device, a payment service device, and so on.

In the location-based service system, the beacon device 100 according to an embodiment of the present invention may seamlessly broadcast a beacon signal through the plurality of Bluetooth communication modules, thus seamlessly providing the location-based service to the terminal device 200 that approaches the beacon device 100.

In the above-described location-based service system, the configuration of the beacon device 100 will be described in detail with reference to FIGS. 2 and 3.

FIG. 2 is a block diagram illustrating the configuration of the beacon device 100 according to an embodiment of the present invention.

Referring to FIG. 2, the beacon device 100 according to an embodiment of the present invention may basically include a plurality of Bluetooth communication modules 110 and a control module 120 and may further include one or more of a storage module 130, a communication module 140, and an input/output interface module 150.

Each of the plurality of Bluetooth communication modules 110 is configured to perform a short-distance communication with the adjacent terminal device 200 within a communication-enabled range on the basis of the Bluetooth low energy (BLE) technology. Particularly, the plurality of Bluetooth communication modules 110 included in the beacon device 100 may operate in a peripheral mode that is defined in the BLE. Specifically, each Bluetooth communication module 110 operates according to control of the control module 120 to broadcast the beacon signal, establishes connection with the terminal device 200 according to a request from the terminal device 200 that has received the beacon signal, and communicates information. Here, the beacon signal broadcast by the Bluetooth communication module 110 may include unique identification information assigned to the beacon device 100 such that the terminal device 200 may identify the beacon device 100. Here, the identification information may be, for example, a universally unique identifier (UUID) which is standardized in the Open Software Foundation (OSF).

The control module 120 is configured to control an overall operation of the beacon device 100 according to an embodiment of the present invention. The control module 120 controls the beacon device 100 to broadcast the beacon signal such that the adjacent terminal device 200 may recognize the beacon device 100 through the Bluetooth communication module 110, and exchanges predetermined information for the location-based service with the connected terminal device 200 through the Bluetooth communication module 110. Particularly, in an embodiment of the present invention, the control module 120 performs control such that one of the plurality of Bluetooth communication modules 110 is activated to broadcast the beacon signal and then when the activated Bluetooth communication module 110 is connected with the terminal device 200, performs control such that another one of the plurality of Bluetooth communication modules 110 is activated to broadcast the beacon signal. That is, the control module 120 controls an operation of the plurality of Bluetooth communication modules 110 according to an operational status of the beacon device 100.

In a case in which the control module 120 performs control such that any one of the plurality of Bluetooth communication modules 110 is selectively activated to broadcast a beacon signal, when a specific Bluetooth communication module is connected with any terminal device 200, the control module 120 performs control such that the remaining standby Bluetooth communication modules are activated to broadcast beacon signals. In addition, the control module 120 may assign respective priorities to the plurality of Bluetooth communication modules 110 and then sequentially activate the plurality of Bluetooth communication modules 110 based on the priorities.

Furthermore, when a connection request is received from the terminal device 200, the control module 120 may perform control such that the connection is established with the terminal device 200 through the Bluetooth communication module 110 that has broadcast the beacon signal to the terminal device 200.

In addition, when the connection request is received from the terminal device 200, the control module 120 may further determine whether the beacon device 100 is connected with another terminal device. When the beacon device 100 is connected with the other terminal device, the control module 120 may perform control such that the connection is established with the terminal device 200 after the connection with the other terminal device is released.

The storage module 130 is a means for storing data or a program needed for an operation of the beacon device 100. In particular, the storage module 130 may store the information to be transmitted and received to and from the terminal device 200 through the Bluetooth communication module 110. The information may include, for example, information on a location where the beacon device 100 is installed, information on a service which is to be provided from the beacon device 100 to the terminal device 200, and so on. Moreover, the storage module 130 may store identification information of the beacon device 100 to be included in the beacon signal that is broadcast through the Bluetooth communication module 110.

Accordingly, the plurality of Bluetooth communication modules 110 may access the storage module 130 according to control of the control module 120 to read information stored in the storage module 130 and transmit the information to the terminal device 200.

Next, the communication module 140 is configured to transmit and receive data through the network 10. Specifically, the communication module 140 may access the service device 300 over the network 10 and transmits and receives data for managing the service device 300 and the beacon device 100 or providing the location-based service to the terminal device 200. For example, according to control of the control module 120, the communication module 140 may transmit data that is received from the terminal device 200 to the service device 300 through the Bluetooth communication module 110 and may receive data that is to be transmitted from the service device 300 to the terminal device 200.

The communication module 140 operates based on a communication technology different from that of the Bluetooth communication module 110 and may be implemented as any one of a Wi-Fi communication module, a Zigbee communication module, a mobile communication module, an optical communication module, a cable communication module, and a wired Internet communication module according to communication technology applied to the network 10. For example, as shown in FIG. 3, the communication module 140 may include a Wi-Fi module 141 and a switching module 142, and access the network 10 through a nearby Wi-Fi access pointer (AP) to transmit and receive data. The Wi-Fi module 141 is a communication module that supports IEEE 802.11-based wireless LAN connection and as such, detects an AP in the vicinity of the Wi-Fi module, establishes connection with the detected AP, and then transmits and receives data through the connected AP. In this case, the AP may be connected to a wired Internet network to support data communication with the service device 300 through the wired Internet network. Furthermore, the switching module 142 is configured to selectively transmit and receive a wireless signal through one antenna and connect the antenna to a transmission unit or reception unit of the Wi-Fi module 141 to enable time division-based transmission and reception.

Lastly, the input/output interface module 150 is connected with an external device (not shown) and configured to input and output data between the external device and the control module 120. The input/output interface module 150 enables the beacon device 100 to be controlled or managed through the external device. For example, the input/output interface module 150 may be a general purpose input output module (GPIO). For reference, the GPIO is a general purpose input/output interface in which a connector is not fixed and is selectively used for input or output, and may include a GPIO pin direction register (GPDR) for setting an input/output direction of the connector, an output circuit for outputting data through the connector, and an input circuit for inputting data through the connector.

An operation of the location-based service system using the beacon device 100 configured as described above will be described below with reference to FIG. 4.

FIG. 4 is a sequence diagram illustrating a service performing process in a location-based service system according to an embodiment of the present invention. For reference, in the following embodiments, a plurality of Bluetooth communication modules 110 include a first Bluetooth communication module 111 and a second Bluetooth communication module 112, and the terminal device 200 will be separately described as a first terminal device 201 that first requests connection to the beacon device 100 and a second terminal device 202 that requests connection to the beacon device 100 that is connected with the first terminal device 201.

Referring to FIG. 4, first, the control module 120 of the beacon device 100 activates the first Bluetooth communication module 111 to instruct the first Bluetooth communication module 111 to perform broadcasting in operation S105. In this case, the second Bluetooth communication module 112 is on standby.

The first Bluetooth communication module 111 of the beacon device 100 broadcasts a beacon signal including unique identification information in operation S110. The beacon signal is transmitted to a number of unspecified terminal devices. Any terminal device 200 that enters communication coverage of the beacon device 100 may receive the beacon signal through a scanning or detection procedure.

Accordingly, any one of a number of terminal devices near the beacon device 100, for example, the first terminal device 201 may receive the beacon signal. When the beacon signal is received, the first terminal device 201 may request connection to the beacon device 100 in operation S115.

The connection request of the first terminal device 201 is delivered to the control module 120 of the beacon device 100, and the control module 120 may control connection with the terminal device according to a predetermined criterion. For example, the control module 120 may instruct the connection when there is no terminal device that is currently connected therewith in S125.

The first Bluetooth communication module 111 of the beacon device 100 may perform connection establishment with the first terminal device 201 according to a predetermined short-distance communication procedure (for example, BLE) in operations S130 and may transmit and receive predetermined information to and from the first terminal device 201 according to control of the control module 120 in operations S135.

In this case, while the first Bluetooth communication module 111 establishes connection with the first terminal device 201 to transmit and receive information, the control module 120 instructs the second Bluetooth communication module 112 to be activated to broadcast a beacon signal in operation S140.

The second Bluetooth communication module 112 of the beacon device 100, which has been on standby, broadcasts the beacon signal in operation S145. That is, connection with the first terminal device 201, transmission and reception of information therebetween and broadcasting of the beacon signal to another terminal device are made at the same time.

In this case, the other terminal device, that is, the second terminal device 202 may approach to receive the beacon signal and request connection to the beacon device 100 in operation S150.

When the connection request of the second terminal device 202 is determined through the control module 120, the beacon device 100 determines whether to be currently connected to the other terminal device. When the beacon device 100 is connected to the first terminal device 201 through the first Bluetooth communication module 111, the beacon device 100 instructs the second Bluetooth communication module 112 to be on standby in operations S155 and S160.

When the first terminal device 201 completes a predetermined processing or gets out of the coverage of the beacon device 100, the connection with the first terminal device 201 may be released in operation S165.

When the connection with the first terminal device 201 is released and the connection release is recognized, the control module 120 of the beacon device 100 instructs the second Bluetooth communication module 112 to establish connection with the second terminal device 202 in operation S170, and the second Bluetooth communication module 112 establishes connection with the second terminal device 202 according to a predetermined communication procedure and transmits and receives information through the established connection in operations S175 and S180.

FIG. 5 is a flowchart illustrating a control method of the beacon device 100 in the process of providing the above-described location-based service. The control method of the beacon device 100 for providing a seamless service according to an embodiment of the present invention will be described with reference to FIG. 5.

Referring to FIG. 5, the beacon device 100 activates any one of the plurality of Bluetooth communication modules 110, for example, the first Bluetooth communication module 111, to broadcast a beacon signal in operation S205. The broadcasting of the beacon signal is repeatedly performed at a certain period, thereby enabling the terminal device 200 approaching the beacon device 100 to recognize the beacon device 100.

The beacon device 100 determines whether a connection request is generated from any terminal device 200 during the broadcasting of the beacon signal in operation S210.

When the connection request is generated from a predetermined terminal device 200, for example, the first terminal device 201, the beacon device 100 determines whether to be connected to another terminal device through any one of the plurality of Bluetooth communication modules 110, for example, a Bluetooth communication module other than the first Bluetooth communication module 111 that currently broadcasts the beacon signal in operation S215.

When the beacon device 100 is determined not to be connected to the other terminal device in operation S220, the beacon device 100 establishes connection with the first terminal device 201 that has requested the connection through the activated Bluetooth communication module, that is, the first Bluetooth communication module 111 that has broadcast the beacon signal in operation S225.

The beacon device 100 transmits and receives predetermined information for the location-based service with the first terminal device 201 through the first Bluetooth communication module 111 in which the connection is established, in operation S230.

Moreover, before or while performing any one of the operations S225 and S230, the beacon device 100 activates another one of the plurality of Bluetooth communication modules, for example, the second Bluetooth communication module 112, to broadcast the beacon signal in operation S235.

In addition, the above-described beacon device 100 determines whether a connection release request is generated from the first terminal device 201 that is connected through the above-described operations S230 and S235 to transmit and receive information in operation S240. When a connection release is requested, the beacon device 100 controls the first Bluetooth communication module 111 to release the connection with the first terminal device 201 in operation S245.

Furthermore, the beacon device 100 may repeatedly perform operations after the above-described operation S210.

Accordingly, while the beacon device 100 is connected with the first terminal device 201 to transmit and receive information, another nearby terminal device may also detect the beacon device 100 and request connection to the beacon device 100.

If a connection request is generated from another terminal device, for example, the second terminal device 202, that has received the beacon signal broadcast through the second Bluetooth communication module 112 while the beacon device 100 is connected with the first terminal device 201 to transmit and receive the information, the connection request of the second terminal device 202 may not be accepted because the beacon device 100 is connected with the first terminal device 201. Accordingly, the beacon device 100 is on standby without immediately performing a request for connection with the second terminal device 202 in operation S250. In this case, the beacon device 100 may send a message that informs the second terminal device 202 of the standby status.

Further, when the connection with the first terminal device 201 is released in operation S245, the beacon device 100 establishes connection with the second terminal device 202 through the second Bluetooth communication module 112 to transmit and receive information in operations S225 and S235.

Further, while the second Bluetooth communication module 112 performs communication with the second terminal device 202, the beacon device 100 may broadcast the beacon signal again through another Bluetooth communication module that is on standby, that is, the first Bluetooth communication module 111.

Thus, the broadcasting of the beacon signal and the communication of data with the terminal device 200 are alternately performed through the plurality of Bluetooth communication modules 110, resulting in the beacon device 100 seamlessly broadcasting the beacon signal.

The method according to an embodiment of the present invention may be implemented in the form of software that is readable by various computer means and may be recorded on a computer-readable recording medium. Here, the recording medium may include a program instruction, a data file, a data structure, or a combination thereof. The program instruction recorded on the recording medium may be designed and configured specifically for the present invention or can be publicly known and available to those who are skilled in the field of computer software. Examples of the recording medium include a magnetic medium such as a hard disk, a floppy disk, and a magnetic tape, an optical medium such as a CD-ROM, a DVD, etc., a magneto-optical medium such as a floptical disk, and a hardware device such as a ROM, a RAM, a flash memory, etc. that is specially configured to store and perform the program instruction. Examples of the program instruction include a high-level language code executable by a computer with an interpreter, in addition to a machine language code made by a compiler. The above exemplary hardware device can be configured to operate as one or more software modules in order to perform the operation of the present invention, and vice versa.

Furthermore, the beacon device 100 according to an embodiment of the present invention may be driven by a instruction for enabling one or more processors to perform the above-described functions and processes. Such instructions can, for example, include interpreted instructions, such as script instructions, e.g., JavaScript or ECMAScript instructions, or executable codes, or other instructions stored in a computer-readable medium. Furthermore, the device according to an embodiment of the present invention may be distributively implemented over a network, such as a server farm, or may be implemented in a single computer device.

Although the specification and drawings illustrate exemplary configurations of the devices, implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, the devices according to the present invention. The computer-readable medium can be a machine-readable storage device, a machine-readable storage substrate, a memory device, a composition of matter effecting a machine-readable propagated signal, or a combination of one or more of them.

The term "system" used herein encompasses all apparatus, devices, and machines for processing data, including by way of example a programmable processor, a computer, or multiple processors or computers. The processing system can include, in addition to hardware, codes that create an execution environment for the computer program upon request, e.g., a code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the requested program, or in multiple coordinated files (e.g., files that store one or more modules, subprograms, or portions of code). A computer program can be deployed to be executed on one computer or on multiple computers that are located at one site or distributed across multiple sites and interconnected by a network.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a network.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the invention.

Therefore, the scope of the present invention should be defined by the following claims, not by the above-described embodiments.

According to an embodiment of the present invention, the beacon device that is a reference for the location-based service includes a plurality of Bluetooth communication modules and activates one of the plurality of Bluetooth communication modules to broadcast a beacon signal, when the activated Bluetooth communication module is connected to a terminal device, activating another one of the plurality of Bluetooth communication modules to broadcast the beacon signal, thus preventing the beacon device from stopping broadcasting the beacon signal, and thereby preventing other nearby terminal devices from failing to recognize the beacon device.

In addition, the present invention seamlessly broadcasts the beacon signal such that the nearby terminal devices may always recognize the beacon device even when the connection with the specific terminal device is established, thereby enabling a seamless service.

The invention claimed is:

1. A beacon device comprising:
a plurality of Bluetooth communication modules, each of the Bluetooth communication modules configured to:
broadcast a beacon signal upon activation,
establish connection with a terminal device that receives the broadcast beacon signal according to a request from the terminal device, and
transmit and receive information to and from the terminal device or release the connection;
a storage module configured to store information transmitted and received through the plurality of Bluetooth communication modules;
a control module configured to perform control so that the beacon signal is broadcast by activating one of the plurality of Bluetooth communication modules in sequence and then activating another Bluetooth communication module when the activated Bluetooth communication module is connected with the terminal device; and
wherein when a connection request is generated by the terminal device, the control module determines whether remaining Bluetooth communication modules other than the activated Bluetooth communication module are connected with other terminal devices and controls the activated Bluetooth communication module to establish connection with the terminal device that generates the connection request when all of the remaining Bluetooth communication modules are not connected.

2. The beacon device of claim 1, wherein the control module assigns respective priorities to the plurality of Bluetooth communication modules and activates the plurality of Bluetooth communication modules according to the priorities.

3. The beacon device of claim 1, further comprising an input/output interface module connected with an external device and configured to input and output data between the external device and the control module.

4. The beacon device of claim 1, further comprising a communication module connected to a wired network or wireless network and configured to communicate with a service device through the wired network or wireless network.

5. The beacon device of claim 4, wherein the communication module includes any one of a Wi-Fi communication module, a Zigbee communication module, a mobile communication module, an optical communication module, a cable communication module, and a cable Internet communication module.

6. A method of controlling a beacon device, the method comprising:
activating one of a plurality of Bluetooth communication modules in sequence;

broadcasting a beacon signal through the activated Bluetooth communication module responsive to activating of the Bluetooth communication module;
receiving a connection request from a terminal device that receives the beacon signal;
controlling the activated Bluetooth communication module to establish connection with the terminal device;
transmitting and receiving information to and from the terminal device having the established connection; and
determining whether the plurality of Bluetooth communication modules are connected with other terminal devices when the connection request is received;
wherein the broadcasting comprises broadcasting the beacon signal by activating another Bluetooth communication module after controlling establish connection with the terminal device, and
wherein the establishing of connection with the terminal device is performed when all of the plurality of Bluetooth communication modules are not connected with the other terminal devices.

7. The method of claim 6, wherein the broadcasting comprises assigning respective priorities to the plurality of Bluetooth communication modules and activating the plurality of Bluetooth communication modules according to the priorities.

8. The method of claim 6, further comprising, when any one of the plurality of Bluetooth communication modules is connected with another terminal device, waiting until the connection is released from the other terminal device, wherein
the establishing of connection with the terminal device is performed when the connection is released from the other terminal device.

9. A non-transitory computer-readable storage medium storing instructions thereon, the instructions when executed by a processor cause the processor to:
activate one of a plurality of Bluetooth communication modules in sequence;
broadcast a beacon signal through the activated Bluetooth communication module;
receive a connection request from a terminal device that receives the beacon signal;
control the activated Bluetooth communication module to establishing connection with the terminal device;
transmit and receive information to and from the terminal device having the established connection; and
determine whether the plurality of Bluetooth communication modules are connected with other terminal devices when the connection request is received,
wherein instructions to broadcast comprises instructions to broadcast the beacon signal by activating another Bluetooth communication module after controlling establish connection with the terminal device,
wherein instructions to establish connection with the terminal device is performed when all of the plurality of Bluetooth communication modules are not connected with the other terminal devices.

10. The non-transitory computer-readable storage medium of claim 9, wherein instructions for the broadcasting comprise instructions causing the processor to:
assign respective priorities to the plurality of Bluetooth communication modules, and
activate the plurality of Bluetooth communication modules according to the priorities.

11. The non-transitory computer-readable storage medium of claim 9, comprising instructions causing the processor to: to
when any one of the plurality of Bluetooth communication modules is connected with another terminal device, wait until the connection is released from the other terminal device, and
wherein the establishing of connection with the terminal device is performed when the connection is released from the other terminal device.

* * * * *